Jan. 16, 1940.  J. H. CADDELL  2,187,300
OIL GAUGE
Filed March 28, 1939
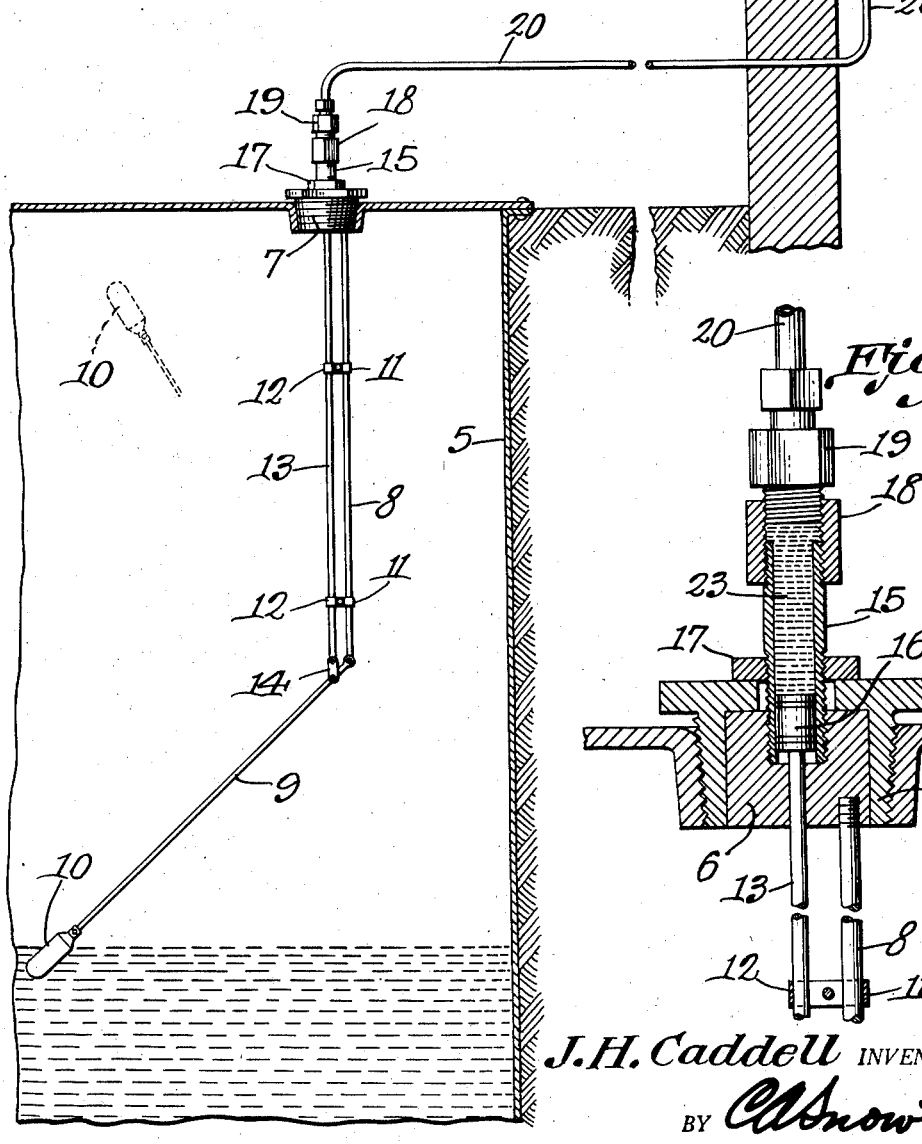
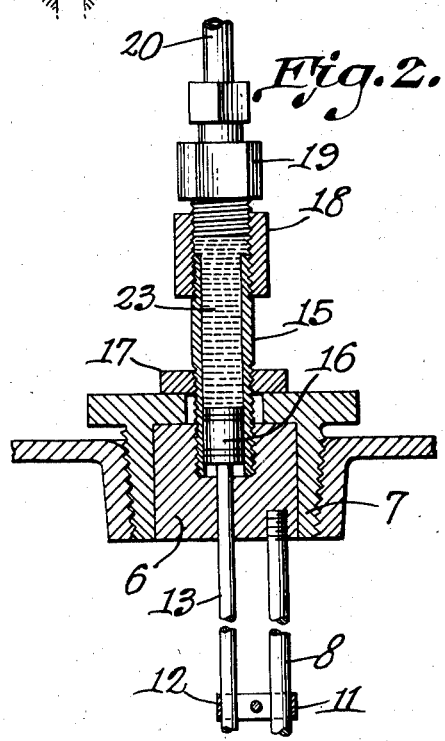
J. H. Caddell INVENTOR.
BY  *C. A. Snow & co.*
ATTORNEYS.

Patented Jan. 16, 1940

2,187,300

UNITED STATES PATENT OFFICE 2,187,300

OIL GAUGE

James H. Caddell, Richmond, Va.

Application March 28, 1939, Serial No. 264,645

2 Claims. (Cl. 73—316)

This invention relates to liquid gauges designed primarily for use in connection with fuel oil tanks, the primary object of the invention being to provide a gauge which may be positioned at a point remote from the tank, for indicating the oil level in the tank.

An important object of the invention is to provide a gauge of this character which may be readily and easily positioned in the usual threaded opening of oil tanks designed for containing fuel oil, in lieu of the usual threaded plug which normally closes the opening, through which a gauge stick is positioned to determine the level of the fuel oil in the tank.

Another important object of the invention is to provide a fitting which may be positioned for the true operation of the float, forming a part of the gauge structure, the securing means operating independently of the supporting plug to which the float and float supporting rod are secured, to the end that the device may be secured without varying the adjusted position of the supporting plug, insuring the true operation of the float.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a sectional view through a fuel oil tank showing a fitting, constructed in accordance with the invention, as positioned in the tank, and illustrating the relation of the gauge proper, with the fitting and tank.

Figure 2 is an enlarged sectional view through the fitting.

Referring to the drawing in detail, the reference character 5 designates a fuel oil tank, which is of the usual and well known construction, the same being formed with a threaded opening in which the usual plug is positioned to close the opening, the plug being removable when it is desired to position a gauge stick, in the tank, to determine the liquid level in the tank.

The device forming the subject matter of the invention, embodies a fitting which is used in lieu of the plug, to close the opening, to the end that the device may be readily and easily positioned, without the necessity of making alterations in the tank construction, to mount the gauge.

In the present showing, the gauge includes a supporting plug 6 which is circular in cross section, the supporting plug being provided with a smooth outer surface, for contact with the smooth inner surface of the nut 7 which is threaded in the usual opening of the tank.

This plug 6 provides a support for the rod 8, which is shown as threaded in an opening in the bottom of the plug, the rod 8 providing the support for the float rod 9 carrying the float 10 at the free end thereof. Brackets indicated at 11 are secured to the rod 8 and have bearings 12 through which the piston rod 13 moves, the piston rod being pivotally connected with the float rod 9, through the link 14.

The reference character 15 designates a cylinder which is formed with threads positioned in a threaded opening of the plug 6, the cylinder being of a length to extend an appreciable distance above the nut 7. Carried on the upper end of the piston rod 13, is a piston 16, which operates in the cylinder 15. A nut indicated at 17 is positioned on the threaded lower end of the cylinder 15, and engages the nut 7, drawing the plug into close engagement with the nut 7, and supporting the plug in proper position.

The upper end of the cylinder 15 is threaded to receive the threaded sleeve 18 into which the coupling 19 which couples the pipe 20 to the fitting, is extended.

The pipe 20, may be of any desired length, the pipe extending to a point remote from the tank 5, or to a point for convenience in reading the gauge. The gauge proper, is indicated by the reference character 21 and includes the usual gauge tube 22, the edge of the gauge being graduated, so that a reading of the fluid level in the gauge, may be accurately made. A suitable fluid is of course housed in the cylinder 15, pipe 20 and gauge tube 22, with the result that as the float 10 is elevated by the filling of the tank 5, the piston 16 will move upwardly, forcing the fluid, which in the present showing is indicated at 23, upwardly in the pipe 20, and of course changing the liquid level in the gauge 22.

As the float 10 is lowered, due to the lowering of the oil level in the tank 5, the piston 16 will move downwardly causing the fluid level in the gauge 22 to lower, indicating the oil level in the tank.

From the foregoing it will be seen that due to the construction of the fitting, the plug 6 may be properly positioned so that the float will move in a vertical line through the center of the tank, whereupon the nut 7 may be rotated independently of the plug 6. After the nut 7 has been properly positioned, the nut 17 is operated to secure the plug 6 in its proper adjusted position. With this structure it is unnecessary to rotate the plug 6, during the securing of the plug in position, thereby eliminating any possibilities of the float being moved to a position to engage the wall of the tank, which of course would prevent the accurate operation of the float.

What is claimed is:

1. A liquid level gauge for tanks, comprising a fitting including a plug, a nut fitted over the plug and adapted to be threaded in an opening of the tank, a cylinder rising from the plug, a nut on the cylinder cooperating with the plug in clamping the plug to the first said nut, a gauge tube, a pipe establishing communication between the gauge tube and fitting, and means including a piston and float for controlling the liquid level in the gauge tube.

2. In a fluid gauge for tanks, a plug, a cylinder extending upwardly from the plug, a nut positioned on the plug and rotatable independently of the plug and adapted to be positioned in an opening of a tank, a nut positioned on the cylinder and adapted to draw the plug into close engagement with the first mentioned nut, a supporting rod secured to the plug, a piston rod operating through the plug, a piston on one end of the piston rod and operating in the cylinder, a gauge including a gauge pipe connected with the cylinder and in which liquid is held, and a float pivotally mounted on the lower end of the supporting rod for actuating the piston rod and piston, and moving the liquid level in the gauge pipe.

JAMES H. CADDELL.